March 25, 1941. F. T. HOWLAND 2,236,317
SCREW-PROPELLED TAIL GATE ELEVATOR
Filed Sept. 26, 1939 3 Sheets-Sheet 1

Inventor
Forster T. Howland,
J. Stanley Burch
Attorney

March 25, 1941.    F. T. HOWLAND    2,236,317
SCREW-PROPELLED TAIL GATE ELEVATOR
Filed Sept. 26, 1939    3 Sheets-Sheet 2
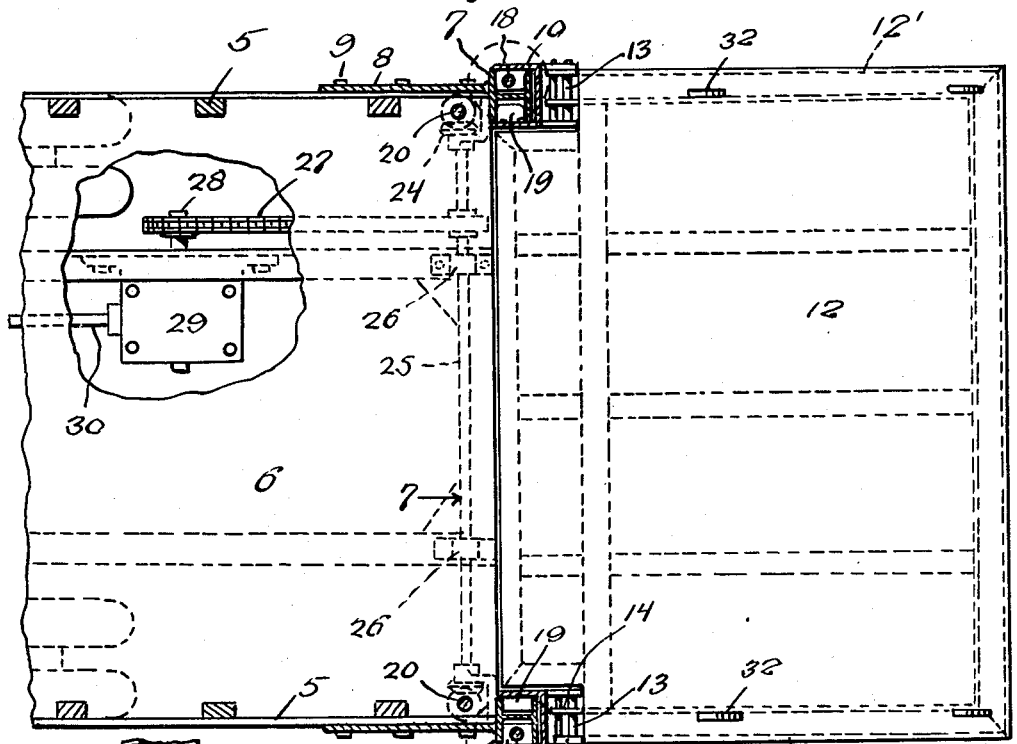
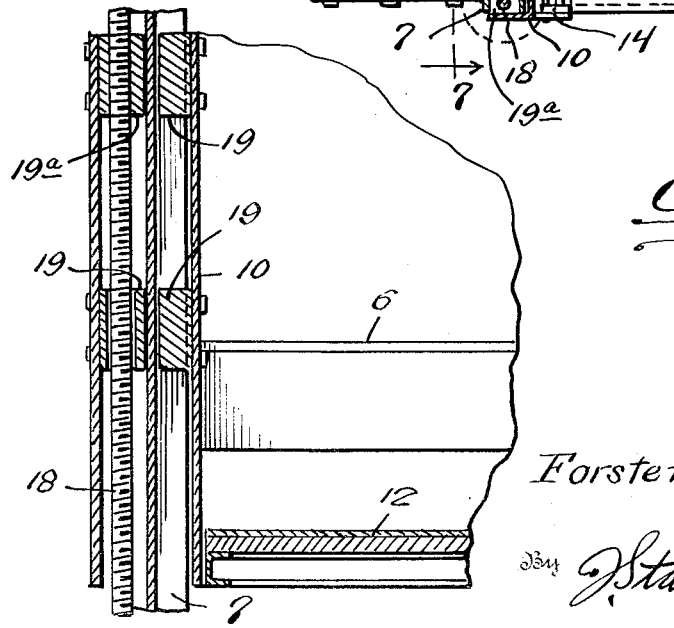
Inventor
Forster T. Howland,
By Stanley Burch
Attorney

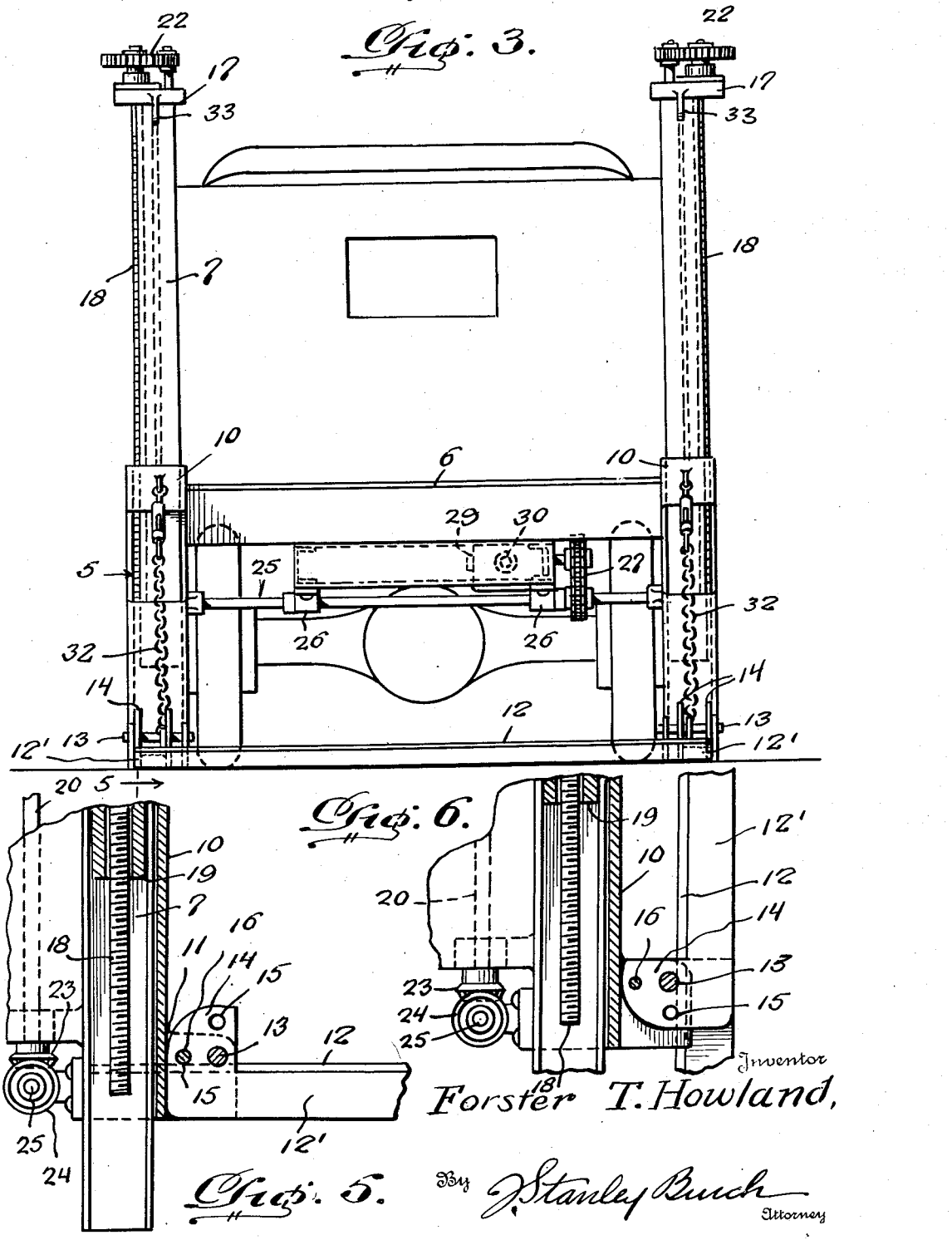

Patented Mar. 25, 1941

2,236,317

UNITED STATES PATENT OFFICE 2,236,317

SCREW-PROPELLED TAIL GATE ELEVATOR

Forster T. Howland, Los Angeles, Calif., assignor, by decree of court, to Anna C. Howland Application September 26, 1939, Serial No. 296,695

4 Claims. (Cl. 214—75)

This invention relates to a tail gate elevator for motor trucks, by means of which heavy objects may be readily placed on and removed from the truck with comparatively little manual labor.

The primary object of the present invention is to provide an elevator of the above kind which is readily applicable to trucks now in use, which is durable in construction, and which is highly efficient in operation.

The present invention particularly contemplates the provision of improved means for guiding and screw means for vertically moving the end gate of the vehicle when disposed in a horizontal position so that the tail gate may be raised to a level with the floor of the vehicle body or lowered to the ground for facilitating loading or unloading of the vehicle body.

Further objects of the invention are to provide means whereby downward movement of the tail gate carriers may be utilized to effect closing of the tail gate, and whereby further downward movement of said tail gate and its carriers after contact with the ground may effect an upward jacking of the rear end of the vehicle to facilitate changing of rear tires, etc. A still further object is to provide simple and efficient means for limiting the downward swinging movement of the tail gate to a substantially horizontal position, and simple and efficient means for effectively maintaining the tail gate in either the horizontal position or a vertical position.

With the above general objects in view, and others that will become apparent as the nature of the invention is better understood, the present invention consists in the novel form, combination and arrangement of parts hereinafter more fully described, shown in the accompanying drawings and claimed.

In the drawings:

Figure 2 is a horizontal section on line 2—2 of Figure 1.

Figure 3 is a rear elevational view thereof.

Figure 4 is an enlarged fragmentary vertical section on line 4—4 of Figure 1.

Figure 5 is an enlarged fragmentary vertical section on line 5—5 of Figure 3.

Figure 6 is a view similar to Figure 5 with the tail gate in a vertical or closed position.

Figure 1:
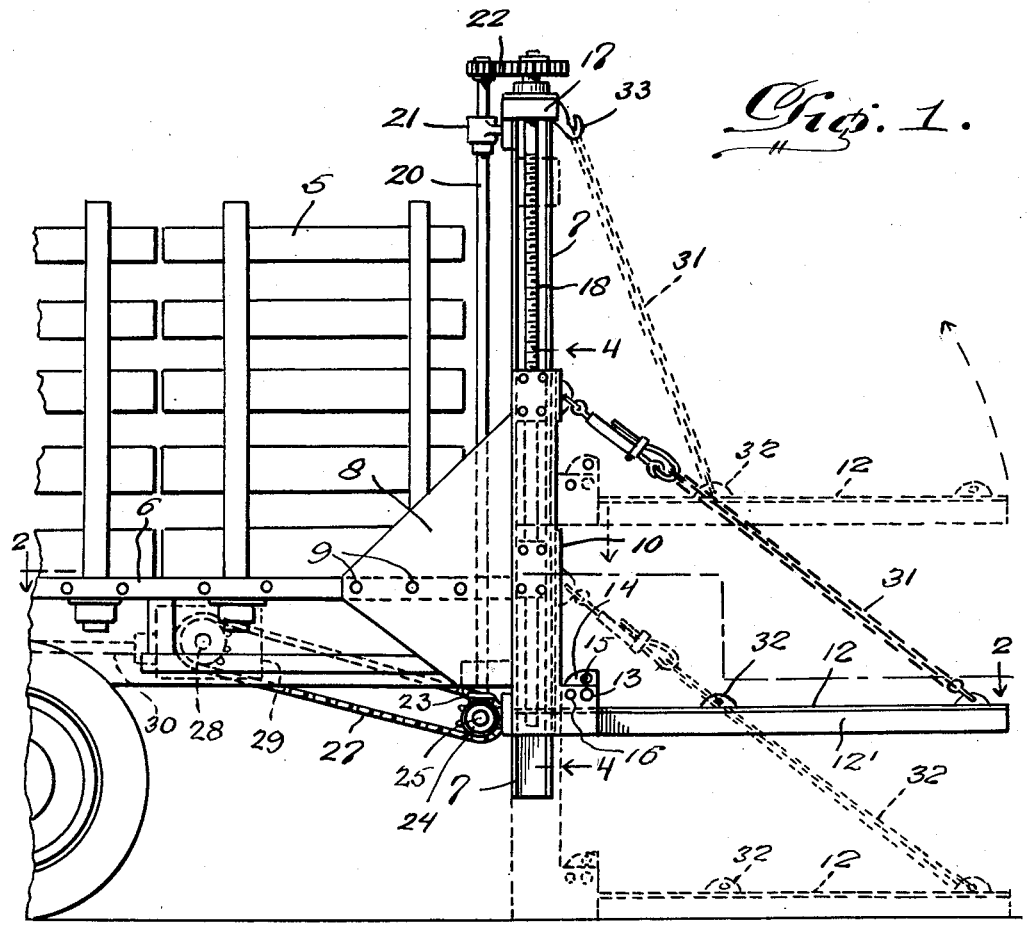
Figure 1 is a fragmentary side elevational view of a motor truck equipped with a tail gate elevator constructed in accordance with the present invention, the tail gate being shown in a horizontal position.
Figure 7:
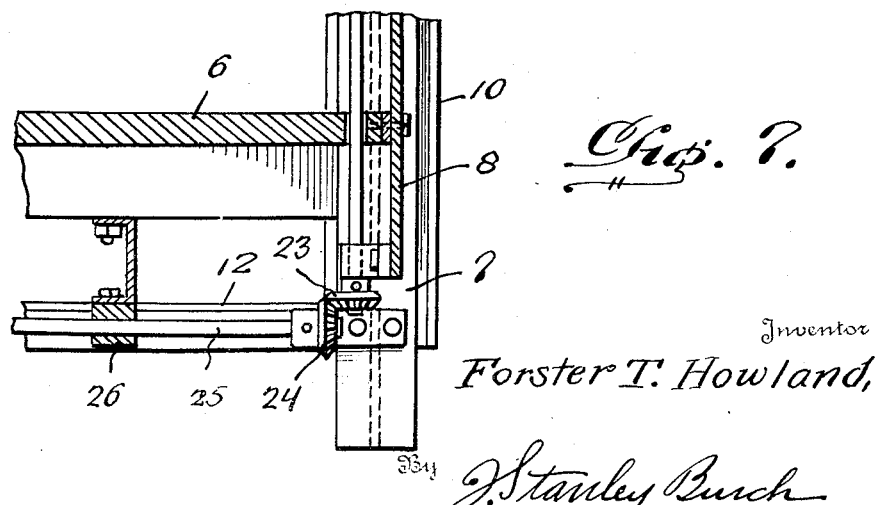
Figure 7 is a fragmentary vertical section on line 7—7 of Figure 2.

By way of illustration, the present invention has been shown as applied to a motor truck having an open body composed of slatted sides 5 and a floor 6. In accordance with the present invention, vertical guide rails 7 of H-beam form are rigidly mounted at opposite sides of the vehicle body at the rear end of the latter, so as to extend above the sides 5 and below the floor 6 as will be apparent from Figure 1. The guide rails 7 are effectively secured and braced in position by means of triangular plates 8 disposed against the sides of the floor 6 and secured to the latter as at 9, vertical edges of the plates 8 being welded to the respective guide rails 7. Vertical tail gate carriers 10 of channel form embrace the sides and rear of the respective guide rails 7 and are vertically movable along the latter. The lower ends of these carriers 10 have rearwardly projecting ears 11 to which hinge members of the tail gate 12 are hinged for vertical swinging movement as at 13. As shown, the tail gate 12 has channel bars 12' whose projecting ends are hinged to the ears 11 by the pin at 13 and which are provided with lateral projecting portions 14 having spaced apertures 15 arranged to respectively coincide with similar apertures of the ears 11 on carriers 10, whereby a pin 16 may be inserted through the registered apertures for either retaining the tail gate 12 in the horizontal position of Figure 5 or in the vertical position of Figure 6.

Disposed on the upper ends of the guide rails 7 are cap members 17 in which are journaled vertical feed screws 18 that are centrally disposed in the outer channels of the guide rails 7 as shown clearly in Figures 1 and 2. Carried by the side flanges of the carriers 10 are guide blocks 19 and 19a that slidably fit in the inner and outer channels of the guide rails 7 for promoting true easy movement of the carriers 10 on said guide rails 7. The upper guide blocks 19a in the outer channels of the guide rails 7 have threaded openings therethrough and form nuts having threaded engagement with the feed screws 18. Thus, when the feed screws 18 are rotated the carriers 10 are caused to move vertically either in an upward direction or downwardly, according to the direction of rotation of said feed screws. In order to avoid interference with lowering of the tail gate 12 to the ground, the feed screws 18 are driven at their upper ends. For this purpose, vertical driven shafts 20 are journaled in bearings 21 directly in front of the guide rails 7, the upper ends of the shafts 20 being geared as at 22 to the upper ends of the feed screws 18. The bearings 21 may be carried by the guide rails 7, and the shaft 20 have beveled pinions 23 on their lower ends meshing with similar pinions 24 on the opposite ends of a horizontal shaft 25 journaled in bearings 26 beneath the floor 6 of the truck and directly beneath the lower ends of the vertical shafts 20. Thus, by driving the horizontal shaft 25 the vertical shafts 20 will be simultaneously driven at a similar speed for similarly driving both of the feed screws 18 at a similar speed so as to correspondingly move the tail gate carriers 10 vertically. A sprocket gearing 27 operatively connects the shaft 25 with the stub shaft 28 projecting from one side of an encased reduction gearing 29 provided on the underside of the truck body forwardly of the shaft 25. A further shaft 30 extends forwardly from this reduction gearing and receives power from the power take-off mechanism of the motor truck. As usual, such power take-off mechanism will have means for throwing the same into and out of operation and for reversing the direction of rotation of shaft 30 so as to permit the tail gate to be raised or lowered at will in a manner which will be generally understood by those skilled in the art.

Suitable chains 31 connect the rear end of the tail gate 12 at the sides of the latter with the upper ends of the tail gate carriers 10 for bracing the tail gate in its lowered horizontal position wherein said tail gate is employed as an elevator platform. However, the chains 31 may be engaged with ears 32 of the tail gate near the pivot of the latter and with hooks 33 carried by the cap members 17 of the guide rails 7 when the tail gate 12 is elevated to a position above the floor of the truck body as indicated by dotted lines in Figure 1. When the chains 31 are connected in this position, lowering of the carriers 10 will result in the chains 31 causing upward swinging movement of the tail gate to its closed position. This will be found very desirable where the tail gate is of extremely large and heavy construction so that manual closing thereof would be extremely difficult. It is further pointed out that the carriers 10 and tail gate 12 are capable of further downward movement after they have contacted the ground, with respect to the guide rails 7. Obviously, such further relative downward movement of the carriers 10 and tail gate 12 will result in jacking the rear end of the truck upwardly so as to elevate the rear wheels of the truck for facilitating changing of rear tires, etc.

From the foregoing description, it is believed that the construction and operation, as well as the advantages of the present invention will be readily understood and appreciated by those skilled in the art. The invention provides a construction which may be readily attached to the rear end of a truck, and the construction is simple, durable, and compact. An elevator is provided which is efficient and easy to operate, and by means of which manual labor is reduced to a minimum in loading and unloading the truck. Minor changes in the details of construction illustrated and described are contemplated within the spirit and scope of the invention as claimed. It will be noted that the projecting ends of channel bars 12' abut the carriers 10 to limit the downward swinging movement of the tail gate to a horizontal position, as shown in Figure 5.

What I claim as new is:

1. In combination, a vehicle body, vertical guide rails fixed to the rear end of the vehicle body at opposite sides of the latter, carriers vertically movable on said guide rails, power-operated means for raising and lowering said carriers, a tail gate hinged to the lower ends of said carriers for vertical swinging movement, means to limit downward swinging movement of the tail gate to a horizontal position, and means to connect the tail gate with the upper ends of the guide rails for utilizing downward movement of the carriers to cause upward swinging of the tail gate to closed position.

2. In combination with a vehicle body, vertical guide rails of H-beam form fixedly mounted on the rear of the body at opposite sides of the latter, said guide rails being arranged to provide inner and outer guide channels facing laterally of the vehicle body, channel-shaped carriers vertically slidable on said guide rails and embracing the sides and rear of said guide rails, guide blocks carried by the carriers and engaging in the inner and outer channels of the guide rails, certain of said guide blocks being carried by the upper ends of the carriers and engaged in the outer channels of the guide rails and provided with threaded openings, cap plates mounted on the upper ends of the guide rails, vertical feed screws disposed in the outer channels of the guide rails and journaled in said cap plates, said feed screws having threaded engagement with the last-named guide blocks, a tail gate hinged to the lower ends of said carriers, vertical shafts journaled directly in front of said guide rails and operatively geared at their upper ends to the upper ends of said feed screws, a horizontal shaft extending transversely of and beneath the vehicle body and operatively geared at its ends with the lower ends of said vertical shaft, and means for driving said horizontal transverse shaft.

3. In combination with a vehicle body, vertical guide rails of H-beam form fixedly mounted on the rear of the body at opposite sides of the latter, said guide rails being arranged to provide inner and outer guide channels, channel-shaped carriers vertically slidable on said guide rails and embracing the sides and rear of said guide rails, guide blocks carried by the carriers and engaging in the inner and outer channels of the guide rails, certain of said guide blocks being carried by the upper ends of the carriers and engaged in the outer channels of the guide rails and provided with threaded openings, cap plates mounted on the upper ends of the guide rails, vertical feed screws disposed in the outer channels of the guide rails and journaled in said cap plates, said feed screws having threaded engagement with the last-named guide blocks, a tail gate hinged to the lower ends of said carriers, vertical shafts journaled directly in front of said guide rails and operatively geared at their upper ends to the upper ends of said feed screws, a horizontal shaft extending transversely of and beneath the vehicle body and operatively geared at its ends with the lower ends of said vertical shaft, means for driving said horizontal transverse shaft, the hinge connections between the tail gate and the lower ends of the carriers being formed to limit downward swinging movement of the tail gate to a horizontal position, and means cooperating with the hinges of the tail gate for securing the latter in either a vertical closed or an open horizontal position.

4. In combination, a vehicle body, vertical guide rails fixed at the rear end of the body and at opposite sides of the latter, said guide rails having channels in the outer sides thereof, cap plates on the upper ends of said guide rails, vertical feed screws arranged in the channels of said guide rails and journaled in said cap plates, vertical shafts journaled directly in front of said guide rails, means operatively gearing the upper ends of said vertical shafts with the upper ends of said feed screws, a horizontal shaft extending transversely beneath the rear end of the vehicle body and operatively geared at its ends with the lower ends of said vertical shafts, means for driving said horizontal transverse shaft, channel-shaped carriers slidable on said guide rails and having guide blocks slidably fitting in the channels of the guide rails, said feed screws having threaded engagement in certain of said guide blocks, and a tail gate hinged to the lower ends of said carriers.

FORSTER T. HOWLAND.